June 16, 1942.    G. H. SMITH    2,286,841
VALVE
Filed July 20, 1939

INVENTOR
GEORGE H. SMITH
BY
ATTORNEY

Patented June 16, 1942

2,286,841

UNITED STATES PATENT OFFICE 2,286,841

VALVE

George H. Smith, Kenmore, N. Y., assignor to The Linde Air Products Company, a corporation of Ohio Application July 20, 1939, Serial No. 285,557

7 Claims. (Cl. 251—121)

This invention relates to a means for controlling the flow through conduits of suspensions of finely-divided solids in gases; and more particularly it concerns a check valve adapted to arrest the back-flow of a fluid in a conduit conducting such a suspension; upon the development of back-pressure at points beyond the valve.

Check valves now are in common use in conduits for preventing the back-flow of fluids therethrough upon the development of abnormally high pressures on the outlet sides thereof. Such valves generally comprise a metal valve member which is held in spaced relation to a cooperating seat during the normal passage of fluid therethrough, but which, upon the development of sufficient back-pressure, moves into contact with said seat, forming a seal and cutting off the back-flow of fluid. While such valves serve satisfactorily for a majority of purposes, I have discovered that they are unable to provide an adequate fluid-tight seal when employed in a conduit conducting a suspension of finely-divided solid material in a gas. Particularly is this true where, as in instances hereinafter named, the finely-divided solid comprises a fuel which, upon combustion, develops tremendous amounts of heat, and which is in suspension in a highly reactive gas such as acetylene; and where, furthermore, upon the development of back-pressure, quantities of oxygen may be forced into the system containing the gas-powder mixture.

According to the present invention, the objectionable features of the usual type of check valve are overcome, and a valve is provided which has special utility in conveying suspensions of finely-divided solids, hereinafter termed "gas-powder mixtures." The check valve comprises two or more valve seat means, and a valve member having a portion initially movable into contact with one of said valve seat means upon the application of a limited back-pressure, thereby forming an initial primary seal. The valve member is so constructed and arranged that upon the application of sufficient back-pressure thereon after the formation of the initial primary seal, it is deformed in a manner to bring an additional portion of the surface thereof into contact with a second valve seat means to form a secondary seal. The construction and arrangement of the valve and valve seats facilitate the gravitational clearance of any particles of powder from the second valve seat subsequent to the formation of the initial seal, and prior to the formation of the secondary seal, thus insuring that the secondary seal will be perfect and will prevent leakage of gas past the valve into the line leading to the apparatus dispensing the gas-powder mixture.

Such a valve may be used advantageously in a conduit conveying to a high temperature heating operation, from a dispenser, a suspension of a powdered solid fuel or flux in a combustible gas, for example, a suspension of iron powder in acetylene. Such an operation, as applied to the thermal piercing of blast holes in massive minerals, is disclosed in application Serial No. 268,634, filed April 18, 1939, by R. B. Aitchison, C. W. Swartout, and V. C. Williams. There a mixture of acetylene gas with a powdered metal and/or a flux supplied from a powder-dispenser is discharged from a blowpipe into a hole where combustion takes place in the presence of a stream of relatively high pressure oxygen. Occasionally the hole being pierced may become clogged up by the accumulation of debris. When this occurs, the increase of pressure therein to a value higher than the pressure of the supplied acetylene gas-powder mixture may force oxygen gas into the acetylene-powder conduit and form a serious explosion hazard. There is also the possibility that oxygen may be forced by the back-pressure into the powder dispenser itself and form therein an explosive mixture with the acetylene gas and powder confined therein. Moreover, upon the development of sufficient back-pressure, the suspended powder may flow back and accumulate in the dispenser passages to cause clogging of the latter, thereby interrupting operations. Obviously the usual type of check valve is unsuited for use in an operation such as mentioned above because small particles of powdered flux or powdered metal fuels may be entrapped between the valve and the valve seat, preventing full closing of the valve, and permitting back-pressure in the outlet line to force gas past the check valve to the dispenser. My novel check valve insures positive closing of the valve by back-pressure in the discharge conduit even in the event that solid particles are entrapped between the valve and the primary valve seat. Access of oxygen to the highly inflammable contents of the dispenser thereby is prevented.

Among the more important objects of the invention are: to provide a novel check valve for controlling the flow of a gas-powder mixture through a conduit, and for sealing the conduit against backward gas flow upon the development of back-pressure; and to provide a novel check valve adapted for use in dispensing a gas-powder mixture, which valve is simple in construction and inexpensive to manufacture.

The above and other objects will be readily apparent from the following description taken in connection with the accompanying drawing in which.

Figure 1:
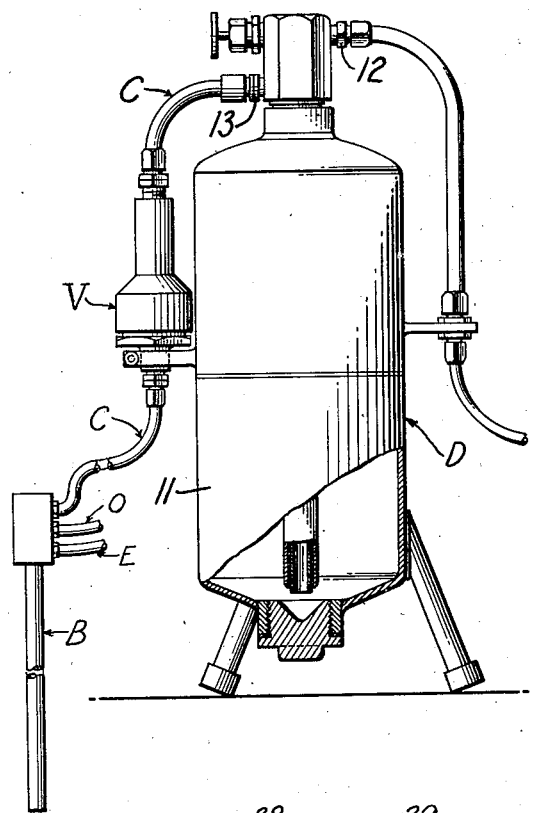
Fig. 1 is an elevational view of a check valve according to my invention, in association with a powder-dispenser and associated parts, parts being shown in section.

Fig. 1 shows a powder-dispenser D adapted to produce and dispense an acetylene-powder mixture which is discharged therefrom into a conduit C, in which is interposed a check valve V. The conduit C is connected at the discharge end thereof to a rock piercing blowpipe B, which also has an oxygen supply conduit O and a supply conduit E for a slag ejection fluid such as water or compressed air. The blowpipe B is adapted to provide a flame for piercing or cutting a solid mineral composition, and a plurality of fluid streams for slag ejection. Various types of such blowpipes are disclosed and claimed in applications Serial Numbers 268,633, filed April 18, 1939, by R. B. Aitchison, C. J. Burch, and C. W. Swartout; and 268,635, filed April 18, 1939, by R. B. Aitchison, G. H. Smith, and C. W. Swartout.

The powder-dispenser D comprises a closed container 11 adapted to contain a supply of powdered flux or other material suitable for rock piercing, and having an inlet 12 for gas and an outlet 13 for a gas-powder mixture, to which outlet is secured the conduit C. One example of such a powder-dispenser is fully disclosed and claimed in application Serial Number 285,558 filed July 20, 1939, by V. C. Williams, C. J. Burch, and G. H. Smith.

Figure 2:
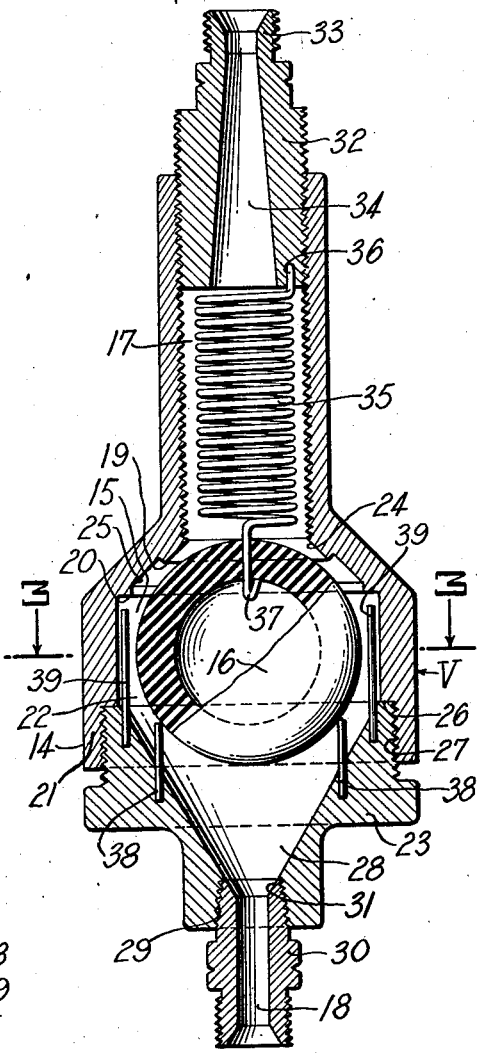
Fig. 2 is an enlarged longitudinal sectional view, partly in elevation, of the check valve of the invention.
Figure 3:
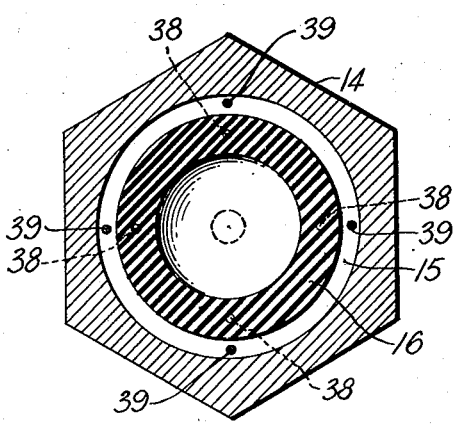
Fig. 3 is a sectional view taken along the line 3—3 of Fig. 2, looking in the direction of the arrows.

As shown in Figs. 2 and 3, the check valve V of my invention comprises generally a hollow tubular housing 14 having a large chamber 15 therein within which is disposed a movable valve member 16 formed of resilient deformable material such as rubber. The housing 14 is provided at its upper portion with a substantially vertical inlet passage 17 opening into the top of the chamber 15, and at its lower portion with a substantially vertical outlet passage 18 leading from the bottom of the chamber 15 substantially axially aligned with the inlet passage 17. Relatively non-deformable valve seat means is provided in the chamber 15, cooperating with the movable valve member 16, comprising an annular primary seat 19, at the top of the chamber 15 surrounding the exit of the inlet passage 17, and an annular secondary valve seat 20, of greater diameter than the primary seat 19 and arranged a short distance below said primary seat and coaxial therewith. The valve member 16 is adapted to contact initially the primary seat 19 when actuated by back-pressure in the chamber 15, and is deformable by additional back-pressure acting thereon after contact with said primary seat to assist in dislodging particles from between the valve and the valve seat means and to bring a new portion of the surface thereof into contact with the secondary seat 20.

More specifically, as illustrated in Figs. 2 and 3, the hollow tubular housing 14 of my check valve includes a tubular body 21 having an enlarged recess 22 in the lower end thereof, and a cap 23 secured to the bottom of the body 21 and substantially covering the recess 22. The body 21 has a restricted internally-threaded inlet passage 17 in the upper end thereof communicating with the enlarged recess 22 in the lower end thereof. The wall of the recess 22 is provided with an annular conical portion 24 adjoining and surrounding the exit of the passage 17, and flaring downwardly therefrom to an annular downwardly facing primary seat 19 in the form of a shoulder. An annular downwardly facing secondary seat 20 in the form of an inwardly extending shoulder of greater diameter than, and substantially coaxial with, the primary seat 19, is spaced a short distance below the primary seat 19. The wall of the recess 22 between the primary seat 19 and the secondary seat 20 is recessed to provide an annular clearance space 25 into which the valve 16 may extend slightly on deformation thereof by back-pressure, so that the seats 19 and 20 may engage the surface of the valve 16 closely about relatively narrow annular zones to create a perfect seal. The wall of the recess 22 below the secondary seat 20 is cylindrical in shape and is provided with an annular shoulder 26 and an internally-threaded portion 27 adapted to receive the cap 23 which abuts against the shoulder 26 and forms a gas-tight and powder-tight seal. The cap 23 is provided with an internal cavity or funnel-like passage 28 having the shape of an inverted cone, the walls of which taper to a bore 29 in the lower end thereof, into which is threaded an outlet nipple 30 having an outlet passage 18 extending therethrough. The inner end of the outlet nipple 30 is countersunk as at 31 and is smoothly joined to and substantially continuous with the wall of the conical cavity 28. Also, the conical-walled cavity 28 is so designed that its wall terminates at the upper end thereof flush with the cylindrical wall of the recess 22 in the body 21. It is evident, therefore, that when the body 21 and the cap 23 are united to form the housing 14, a gas-powder mixture may pass substantially in a straight line from the inlet 17 to the outlet 18, through the internal chamber 15, without the possibility of powder clogs forming, as there are no ledges upon which powder might accumulate.

An adaptor plug 32, having a hose connection nipple 33 at the top thereof and a downwardly flaring passage 34 therethrough, is adjustably threaded into the body 21 at the top of the inlet passage 17. A coil spring 35 is suspended in the inlet passage 17 from the bottom of the adaptor plug 32, to which its upper end is secured as by silver soldering at 36. To the lower end of this coil spring 35, and within the chamber 15, is secured a hollow spherical valve ball 16, as by the hook 37 imbedded in the wall thereof. Preferably the valve ball 16 is formed of rubber, although other resilient deformable materials, which are chemically and physically resistant to the particular gas-powder mixture used, may be employed.

The tension of the spring 35 is so regulated by means of the adjustable adaptor plug 32 that, when no gas-powder mixture is passing through the valve V, an upward force is exerted upon the valve 16 to hold it against the primary seat 19. Thus, when a gas-powder mixture is passing through the valve, the valve ball 16 is forced away from the valve seats 19 and 20 and held in spaced relation thereto by the force of the flowing gas, which is greater than the tension of the spring 35. Upon the occurrence of back-pressure in the chamber 15, however, the force of the back-pressure tends to close the valve 16 against the valve seats, and the speed of closing is expedited by the force of the spring 35, which continually urges the valve 16 toward the primary seat 19. Regulation of the spring tension may be accomplished by turning the adjustable adaptor plug 32 up or down in the inlet passage 17, according to whether greater or less tension is desired. When the proper setting has once been obtained, the plug 32 may be soldered to the housing 14, or otherwise fixed in position if desired.

To limit the extent of the longitudinal downward movement of the valve ball 16 so as to prevent said valve ball from contacting the conical wall of the cap cavity 28 and closing the valve outlet during normal operation, when a gas-powder mixture is flowing through the valve, four vertical projecting pin-like or wire-like guides 38 are secured to the cap 23 in the wall of the cavity 28 at points substantially equally spaced from one another on a circle of smaller diameter than the diameter of the valve ball 16. These guides terminate at their upper ends in a common horizontal plane, thus acting to limit not only the longitudinal motion of the valve ball 16 on contact therewith, but also serving to hold the valve ball properly centered in the chamber 15.

In order to prevent any lateral motion of the valve ball 16, during normal operation, from bringing the surface thereof into contact with the internal walls of the chamber 15, a second similar set of four vertical wire-like guide pins 39 is also secured to the cap 23 in the wall of the cavity 28 at points substantially equally spaced from one another about a circle of slightly greater diameter than the diameter of the valve ball 16. These guide pins extend upwardly into the cylindrical portion of the recess 22 and are adapted to give sufficient lateral clearance for the longitudinal motion of the valve ball 16 without permitting contact of the valve ball with the chamber walls. It has been found that when the check valve is tipped at a slight angle from the vertical during use, the valve ball tends to contact the chamber wall, and powder accumulates at the point of contact, producing clogging of the valve unless means, such as the projections described, are provided for preventing such contact.

During the normal passage of a gas-powder mixture through the valve V, the pressure exerted thereby upon the valve ball 16 urges it downwardly away from the primary seat 19 against the tension of the spring 35 so that there is sufficient clearance between the valve ball and the seats 19 and 20 for the admission of a gas-powder mixture from the restricted inlet passage 17 to the relatively large chamber 15, from which the gas-powder mixture passes out through the restricted outlet passage 18. As has been previously described, the design of the chamber 15 is such that any powder which falls out of suspension in the gas, as a result of the reduction of pressure and velocity in the relatively large chamber 15, drops down over the downwardly sloping surface of the ball 16 which resists the accumulation of powder, and upon the conical wall at the lower end thereof under the influence of gravity. It is again picked up by the gas which exits through the restricted outlet passage 18 at increased velocity. Furthermore, the substantially continuous streamlined internal walls of the chamber 15 provide a minimum of resistance to the passage of powder and prevent clogging of the chamber with powder.

Back-pressure which occurs in the conduit C is communicated to the valve through the outlet passage 18 and forces the movable valve member 16 upwardly in the chamber 15 until an upper portion of the convex surface thereof engages the upper primary seat 19. The upward motion is expedited by the retractive action of the tensed spring 35. Although the initial seal thus formed is sufficient to prevent the back-flow of an unduly large volume of gas to the dispenser D, particles trapped between the primary seat 19 and the valve member 16 may permit the leakage of small quantities of gas, which might form a dangerous explosive mixture in the dispenser D. On the continuation of back-pressure after formation of the initial seal, however, the resilient valve ball 16 is deformed to a substantially ellipsoidal shape and a lower portion of the convex surface thereof pressingly engages the lower secondary seat 20, which has been left clean by the gravitational fall of powder from the clearance space between the secondary seat and the surface of the valve ball after the primary seating action. Engagement of the valve member 16 with both the primary seat 19 and the secondary seat 20 is improved by the provision of the recess 25 into which a portion of the surface of the valve member may recede on the deformation thereof. Thus, a positive and perfect seal is obtained which would not be possible with an ordinary single seating check valve. Upon dissipation of the back-pressure and resumption of flow in the normal direction, it is evident that the resilient valve member 16 is restored to its original spherical shape.

Although I have described my invention specifically in connection with a check valve for use in gas-powder mixture conduits, it is evident that the principles of the invention may be extended to other types of valves useful in controlling the flow of gas-powder mixtures through conduits. It is also to be understood that, although I have shown my improved check valve as divorced from the powder-dispenser, the valve and dispenser may be combined into a single unitary structure if desired.

I claim:

1. A gas-powder mixture check valve adapted for use with mixtures of gases and powdered solids comprising a housing having a chamber therein provided with an inlet at the upper end thereof and an outlet at the lower end thereof substantially axially aligned with said inlet to provide substantially straight-line flow for said mixture through said valve; an annular primary seat in said chamber adjacent to said inlet and substantially coaxial therewith; an annular secondary seat in said chamber below said primary seat and substantially coaxial therewith, said secondary seat having a greater diameter than said primary seat; a ball valve in said chamber in spaced relation to said seats during the normal passage of a gas-powder mixture from said inlet to said outlet, said valve being formed of resilient deformable material, said valve being adapted upon the development of a back pressure in said mixture to move upwardly into contact with said primary seat to form an initial seal while leaving a clearance space between said secondary seat and said valve, and said valve being deformable by the application of additional back pressure thereto after contact with said primary seat to contact said secondary seat.

2. A check valve for use in a gas-powder mixture conduit comprising, a housing having a chamber therein, said chamber having a substantially vertical inlet at the upper end thereof and a substantially vertical outlet at the lower end thereof aligned with said inlet, said chamber having an inside wall tapering downwardly to said outlet to provide a minimum of resistance to the passage of powder through said chamber; means providing a primary seat in said chamber adjacent to said inlet; means providing a secondary seat in said chamber adjacent to and below said primary seat; a back-pressure actuatable valve member in said chamber cooperating with said seats, said valve member being formed of resilient deformable material, said valve member being adapted to move upwardly to contact said primary seat on the occurrence of back-pressure in said chamber, and being deformable by back-pressure in said chamber after contact with said primary seat to contact said secondary seat.

3. A check valve adapted for use with mixtures of gases and powdered solids comprising a housing having a chamber therein provided with a substantially vertical inlet, and a substantially vertical outlet below said inlet; valve seat means in said housing adjacent to said inlet; a movable valve member in said chamber cooperating with said valve seat means, said valve member being formed of resilient deformable material having downwardly sloping surfaces adjacent to said valve seat means to resist the accumulation of said powdered solids on said surfaces, said valve member being actuatable by back-pressure of the mixture in said chamber to move into contact with an upper portion of said valve seat means to form a primary seal, and being deformable by back-pressure after the formation of said primary seal to bring a new portion of the surface thereof into contact with a lower portion of said valve seat means to form a secondary seal; and substantially vertical wire-like guide means in said chamber for spacing said valve member on all sides from the internal wall of said chamber during the normal passage of a gas-powder mixture from said inlet to said outlet.

4. A gas-powder mixture check valve comprising a housing having a chamber therein provided with an inlet and an outlet below said inlet; means providing a primary seat in said chamber; means providing a secondary seat in said chamber below said primary seat; a valve member in said chamber cooperating with said seats, said valve member being formed of a resilient deformable material, and said valve member being movable by back-pressure of said mixtures in said chamber to contact said primary seat and being deformable by back-pressure of said mixture in said chamber after contact with said primary seat to contact said secondary seat; means comprising a plurality of wire-like projections in said chamber limiting the lateral movement of said valve member during normal operation to prevent contact thereof with the walls of said chamber; and means comprising a plurality of wire-like projections in said chamber limiting the downward movement of said valve member during normal operation to prevent contact thereof with the walls of said chamber.

5. A powder-gas mixture check valve adapted to inhibit the settling out of powder from said mixture during passage through said valve, and the accumulation within said valve of such settled powder, said check valve comprising a valve housing having a chamber therein, and having a substantially vertical inlet at the upper end of said chamber, and a substantially vertical outlet at the lower end of said chamber substantially aligned with said inlet, said chamber being free of ledges and having at its lower portion a conical passage with side walls converging downwardly toward said outlet to resist the accumulation of powder in said chamber; annular seat means adjacent to and substantially coaxial with said inlet; a resilient ball valve member within said chamber and spaced from said seat means when normally in open position but movable upwardly against said seat means by a back pressure in said mixture to close said valve, said ball being deformable by said back pressure after initially contacting said seat means to assist in dislodging particles of powder from between the downwardly sloping walls of said ball and said seat, whereby said particles fall into said conical passage and a portion of said seat means is left clean for contact with the surface of said ball upon deformation of the latter.

6. A check valve as claimed in claim 5 including pin-like projections extending substantially vertically from said converging wall to points adjacent to said ball valve member to control the movement of said ball during opening and closing of said valve.

7. A powder-gas mixture check valve adapted to inhibit leakage resulting from the accumulation within said valve of powder settling out of said mixture during passage through said valve, said check valve comprising a valve housing having a valve chamber therein, a substantially vertical inlet opening into the upper end of said chamber, and a substantially vertical outlet extending from the lower end of said chamber in substantial alignment with said inlet; a pair of annular downwardly-facing valve seats in said chamber adjacent to and substantially coaxial with said inlet, the smaller of said seats being above the larger of said seats; a resilient ball within said chamber and spaced slightly from said seats when said valve is in the normal position, said ball being movable by back pressure of said mixture into contact with said smaller seat, and being deformable by said back pressure after contacting said smaller seat to seal against said larger seat; the interior of said valve being free of ledges, and having a funnel-like passage joining chamber and said outlet through which powder particles may fall to said outlet.

GEORGE H. SMITH.